(12) United States Patent
Wirtl et al.

(10) Patent No.: US 7,343,845 B2
(45) Date of Patent: Mar. 18, 2008

(54) FLUID OPERATED POSITION REGULATOR

(75) Inventors: Hannes Wirtl, Schongau (DE); Martin Maichl, Salach (DE); Herbert Frisch, Gfoehl (AT)

(73) Assignee: Festo AG & Co., D-73734 Esslingen (DE)

( * ) Notice: Subject to any disclaimer, the term of this patent is extended or adjusted under 35 U.S.C. 154(b) by 0 days.

(21) Appl. No.: 11/496,908

(22) Filed: Aug. 1, 2006

(65) Prior Publication Data

US 2007/0045579 A1    Mar. 1, 2007

(30) Foreign Application Priority Data

Aug. 23, 2005   (EP)   .................................. 05018231

(51) Int. Cl.
*F16K 31/00*   (2006.01)
(52) U.S. Cl. .............. 91/358 R; 137/625.61; 251/129.04; 251/129.06
(58) Field of Classification Search ........... 251/129.04, 251/129.05, 129.06; 137/625.61, 625.62; 91/358 R, 388
See application file for complete search history.

(56) References Cited

U.S. PATENT DOCUMENTS

| | | | | |
|---|---|---|---|---|
| 1,912,184 A | * | 5/1933 | Ferris et al. ............... | 91/358 R |
| 2,241,545 A | * | 5/1941 | Ernst ......................... | 91/358 R |
| 3,152,612 A | * | 10/1964 | Avery ...................... | 251/129.06 |
| 3,183,918 A | * | 5/1965 | Bester .................... | 137/625.61 |
| 3,996,839 A | * | 12/1976 | Norwood ...................... | 91/388 |
| 4,037,619 A | * | 7/1977 | Jeschke ........................ | 91/388 |
| 4,335,645 A | * | 6/1982 | Leonard ....................... | 91/388 |
| 4,705,059 A | * | 11/1987 | Lecerf et al. .......... | 251/129.06 |
| 5,240,041 A | * | 8/1993 | Garnjost ................ | 137/625.62 |
| 5,709,245 A | * | 1/1998 | Miller ................... | 251/129.04 |
| 6,021,799 A | | 2/2000 | Price | |

FOREIGN PATENT DOCUMENTS

| | | |
|---|---|---|
| DE | 3722315 A1 | 1/1989 |
| DE | 19504364 A1 | 8/1996 |
| EP | 0474437 A2 | 3/1992 |
| EP | 0726511 B1 | 8/2001 |
| EP | 1207329 B1 | 3/2003 |
| JP | 05158552 | 6/1993 |

* cited by examiner

*Primary Examiner*—John Bastianelli
(74) *Attorney, Agent, or Firm*—Hoffmann & Baron, LLP

(57) ABSTRACT

A fluid operated position regulator comprises a servo means, arranged in a regulator housing and by which a supply connection, a venting connection and a power connection can be placed in circuit in an adjustable manner. To predetermine or set its position the servo means possesses two mutually oppositely orientated fluid actuating faces of equal size, which respectively delimit a control chamber. The two control chambers are connected by way of an intermediately placed choke means with a common control pressure connection. Downstream from the two choke means each control chamber is connected with a venting connection. A control valve means can control the two venting connections and in particular simultaneously close them.

17 Claims, 3 Drawing Sheets

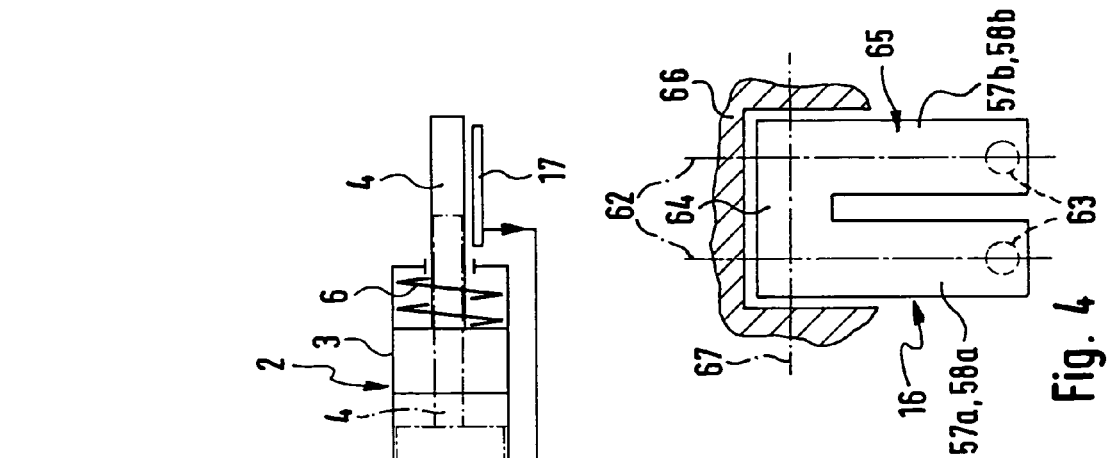
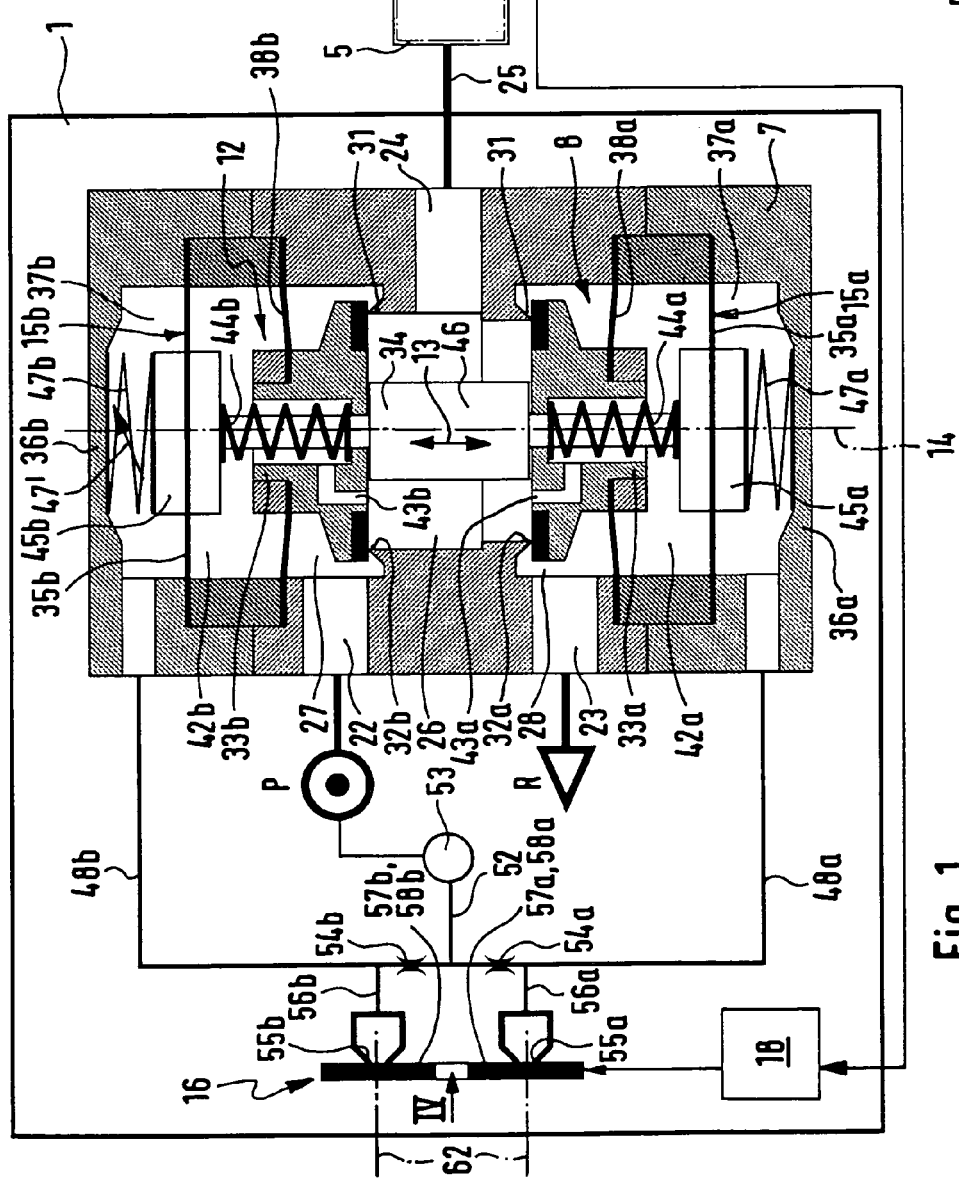
Fig. 1
Fig. 4

FLUID OPERATED POSITION REGULATOR

CROSS-REFERENCE TO RELATED APPLICATION

This application claims priority based on European Patent Application No. 05 018 231.0 filed on Aug. 23, 2005, which is incorporated herein by reference.

BACKGROUND OF THE INVENTION

1. Field of the Invention

The invention relates to a fluid operated position regulator for power devices and in particular for process valves, comprising a regulator housing, in which at least one servo means, which is able to be shifted by controlled fluid actuation with the performance of a positioning movement, is arranged, said servo means being able, in a fashion dependent on its position, to place, in different manners, a supply opening, a venting opening and a power connection provided for the connection of the power device, in a fluid circuit with each other.

2. Description of the Related Art

A position regulator disclosed in the European patent publication 0 726 511 B1 of this type comprises a servo means arranged in a regulator housing which is in a position of connecting a power connection in a manner dependent on the assumed position selectively with a supply connection or a venting connection or simultaneously disconnecting them from both of them. It is in this manner that the fluid pressure available at the power connection, which is for example employed for the actuation of process valve or some other power device, is able to be set in accordance with requirements. The position, dictating the current switching state, of the servo means may be influenced by an adjustable control pressure, which acts on a diaphragm element of the servo means in a manner opposite to a mechanical spring means. Since the position regulator is so designed that the servo means assumes the venting position in the case of a control pressure being equal to the pressure of the surroundings, it is relatively difficult to exactly so set the control pressure that there is a closed state separating the power connection simultaneously from the two other connections and entailing a constant position of the power device which is connected.

SUMMARY OF THE INVENTION

One object of the present invention is to devise a space-saving fluid operated position regulator which with simple means ensures an exact control of a power device.

In order to achieve these and/or other objects appearing from the present specification, claims and drawings, in the present invention there is a provision such that for setting its position the servo means has two fluid actuating faces facing in opposite directions of the servo motion and of equal effective sizes, each such face delimiting a control chamber and the two control chambers being provided with a common control pressure connection with which they are respectively connected for fluid flow by way of an intermediately placed choke means and that the two control chambers are connected downstream from the respectively associated choke means with a venting opening, said two venting openings being provided with an electrically actuated control valve means, said valve means constituting a single unit with the regulator housing and being able to respectively selectively open or close the two venting openings, including a simultaneous closing of both venting openings.

The symmetrical design as regards the two fluid actuating faces in connection with the control by way of a common associated control pressure connection offers the guarantee that in the case of a simultaneous vent closure of both venting openings the fluid forces operative at the servo means will compensate one another and a clearly defined position will obtain. There is in particular, when the venting openings are closed, the possibility of setting a home position of the servo means in which the power connection is separated both from the supply connection and also from the venting connection and maintaining a constant power pressure. Since the two control chambers are connected with one and the same control pressure connection, the accuracy of regulation is independent of any fluctuations in the control pressure. In order to cause a servo movement of the servo means, which entails a change in the power pressure effective at the power connection, either of the two venting openings may be opened by appropriate electrical control of the control valve means so that there is a pressure drop in the connected control chamber which entails an excursion of the system. The combination of the regulator housing with the control valve means as a single structural unit ensures compact dimensions and simple handling during installation on site.

Advantageous embodiments of the invention will appear from the claims.

In principle it would be possible to supply the control pressure connection independently of the supply connection with pressure medium subject to the desired pressure. However it is preferred to have a structure in which the control pressure connection is supplied with pressure on board the position regulator from the supply connection with the intermediate connection of a pressure regulator rendering possible the setting of a control pressure which is lower than the supply pressure so that with the venting openings open the fluid losses are at a minimum.

The control valve means may be a proportional valve means, which renders possible a continuous, stepless actuation so that it is not only possible to switch between a closed position and a certain open position but also to set at intermediate positions with adjustable cross sections. As an alternative however a design in the form of a switching valve means would be possible, in particular in combination with means for pulse width modulation control.

The control valve means is preferably a piezoelectric valve means and possesses piezoelectrically activated valve members. This means that particularly compact dimensions are possible in conjunction with a low electrical power requirement.

In the case of the use of a piezoelectric control valve means it is expedient to adopt a structural design which exhibits two valve members associated with one respective venting opening and constituted by two adjacently placed strip-like piezoelectric flexural transducers, which are components of an integral flexural transducer unit. Such a flexural transducer unit may be much more precisely controlled than two separate flexural transducers owing to the symmetrical structure.

With such a flexural transducer unit a particularly large range of strokes or stroke sizes may be produced of the two valve members and accordingly there is a relatively larger range of the outlet flow cross section which may be set, when the flexural transducer unit exhibits has a bearing section producing a rigid ganging connection between the two flexural transducers, such section being mounted for pivoting motion in relation to the valve housing. The operation of opening one respective valve member may hence be aided by thrusting the other valve member with an enhanced closing force against the valve seat of the associated venting opening, the flexural transducer unit being tilted about the bearing section. Such a control valve means is disclosed in the patent publication EP 1 207 329 B1 which is particularly suitable for the present position regulator.

The two fluid actuating faces responsible for the position of the servo means are preferably located on two diaphragm elements, which are preferably arranged on the two mutually axially opposite terminal sections of the servo means.

Preferably the servo means comprises a plunger-like servo members able to be set in relation to the regulator housing and which at its two terminal sections is suspended by way of an outer diaphragm element on the regulator housing, such outer diaphragm element defining the associated fluid actuating face. This servo member preferably furthermore bears two moving closure member able to cooperate respectively with one valve seat of the housing surrounding a transfer flow opening, there being a power chamber, connected with the power connection, between the two transfer flow openings, such chamber being able in a manner dependent on the position of the valve members to be selectively connected with the supply connection or with the venting connection or separated simultaneously from such two connections.

In order to achieve a clearly defined home position the servo member is preferably axially biased by two oppositely acting spring means in relation to the regulator housing. In order to be able to influence the characteristic of the position regulator preferably at least one of the spring means is able to be adjusted as regards is spring setting force.

Further advantageous developments and convenient forms of the invention will be understood from the following detailed descriptive disclosure of embodiments thereof in conjunction with the accompanying drawings.

BRIEF DESCRIPTION OF THE DRAWINGS

FIG. 1 shows a preferred first structural design of the position regulator in accordance with the invention, partly diagrammatically and partly in a longitudinal section, the entire arrangement being illustrated in the home position of the servo means.

FIG. 4 diagrammatically shows a plan view looking in the direction of the arrow IV of a particularly advantageous design of a flexural transducer unit of the control valve means.

DETAILED DESCRIPTION OF THE PREFERRED EMBODIMENTS

Figure 2:
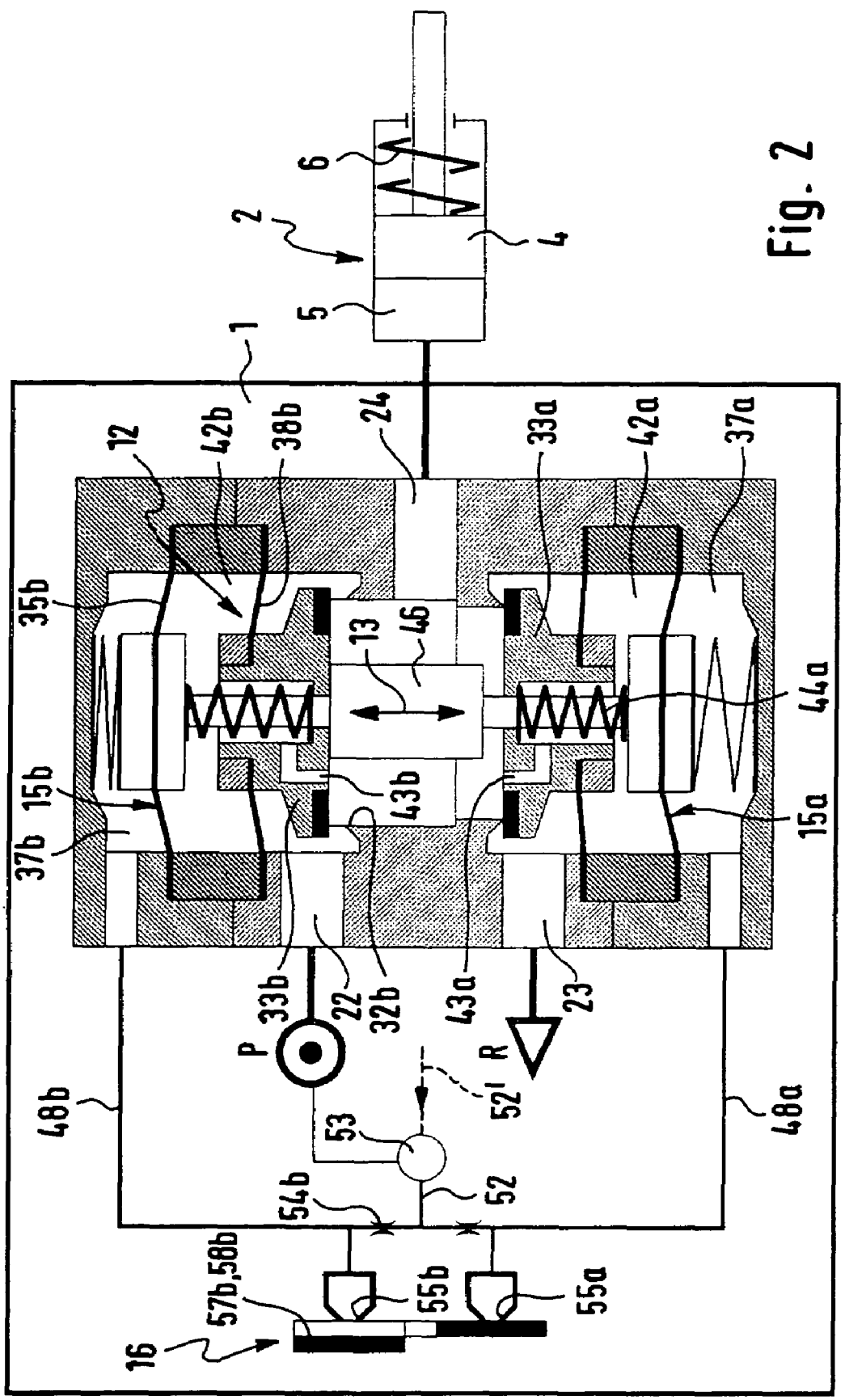
FIG. 2 shows the arrangement of FIG. 1 in the supply position of the servo or setting means.

The fluid operated position regulator generally referenced 1 is designed in the form of one structural unit wherein the individual components are compactly nested together. It is merely for the sake of a straightforward synoptic view that the individual components in the drawing are illustrated within the rectangular frame defining the position regulator 1.

Figure 3:
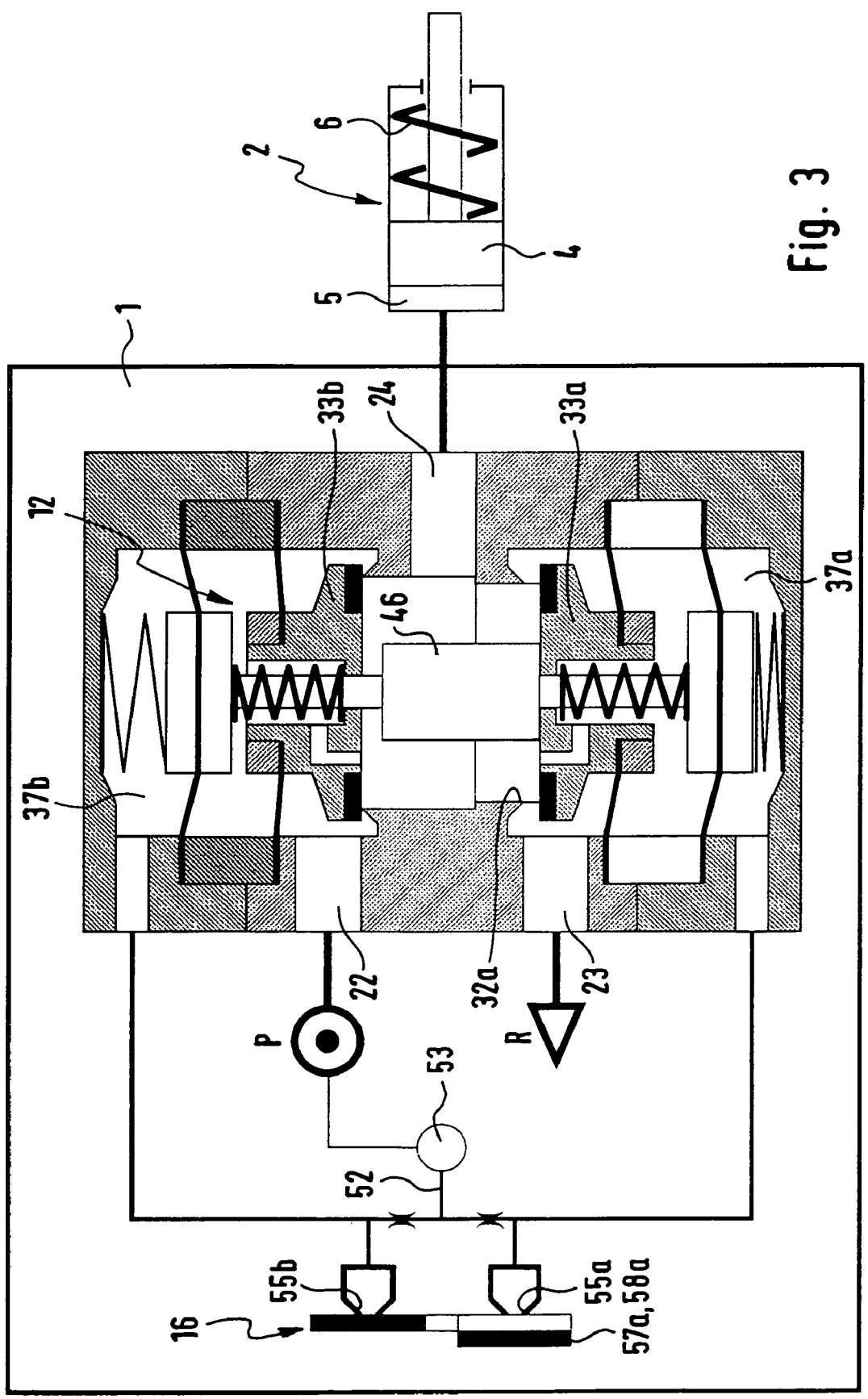
FIG. 3 shows the arrangement of FIGS. 1 and 2 in the venting position of the servo means.

As shown in FIGS. 1 through 3 there is furthermore a power device 2 or load able to be controlled by the position regulator 1, in the case of which in the present example it is a question of a single acting fluid power drive of a process valve, not illustrated in detail, with its further components.

The power device 2 comprises a housing 3 and an outlet part 4 able to be linearly shifted or also shifted in rotation in relation to the housing 3, the outlet drive part 4 defining in conjunction with the housing 3 a drive chamber 5 able to be put under pressure medium pressure against the return force of the spring means 6.

The fluid action in the drive chamber 5 may be set by the position regulator 1 in a controlled manner in order to get a predetermined position of the output drive part 4 and consequently of parts driven by it, the latter being for example a valve spool.

In the case of the pressure medium employed for operation it is more particularly a question of compressed air. In principle however other gaseous media or also hydraulic media could be utilized.

The position regulator 1 comprises a regulator housing 7 in which an elongated housing chamber 8 is delimited containing a servo means comprising several components and generally referenced 12. The servo means 12 has an elongated geometry too and it or rather its individual components are in a position to perform a linear movement, termed the servo movement 13, in the direction of the longitudinal axis 14 of the housing chamber 8 in relation to the regulator housing 7.

The servo motion 13 of the servo means 12 and the resulting positioning s due to controlled fluid action on two fluid actuating faces 15a and 15b turned in opposite directions of the servo means 12. For the control of the fluid action an electrically operated control valve means 16 is provided. Its operation takes place in a fashion dependent on position signals, obtained by a suitable sensor means 17, as for instance a displacement measuring system from the output drive part 4 of the power device 2 and passed on to an electronic control means 18, which produces the electrical actuating signals for the control valve means 16. The electronic control means 18 is only illustrated in FIG. 1 for the sake of simplicity and is best designed as a constituent of the position regulator 1 as a structural unit.

On the regulator housing 7 there are a supply connection 22, a venting connection 23 and a power connection 24. The supply connection 22 is able to be connected with a pressure source P, in particular a source of compressed air. It provides the pressure medium necessary for the operation of the output drive part 4.

The venting connection 23 is connected with the atmosphere R. If the position regulator 1 is operated with a hydraulic medium, the venting connection 23 will lead to a tank.

The power connection 24 serves for the connection of the power device 2. Normally it will be connected by way of a fluid line 25, which may be an integrated fluid duct, with the drive chamber 5.

The three above mentioned connections 23, 24 and 25 communicate by way of the housing chamber 8 by way of fluid ducts extending through the regulator housing 7. Such ducts open at the side into the chamber. The power connection 24 communicates with a longitudinal section, termed the power chamber 26, of the housing chamber, whereas the supply connection 22 is constantly connected with a supply chamber 27 and, respectively, the venting connection 23 with a venting chamber 28.

The power chamber 26 is axially flanked on one side by the supply chamber 27 and on the other side by the venting chamber 28. The power chamber 26 is connected with each of the chambers 27 and 28 flanking it by way of a transfer opening 32a and 32b, which is delimited by an annular valve seat 31 axially facing the associated venting chamber 28 and respectively the supply chamber 27, such valve seat being opposite in each case to a closure member 33a and 33b capable of moving in the direction of the longitudinal axis 14.

The two closure members 33a and 33b arranged in the venting chamber 28 and, respectively, in the supply chamber 27 have a central plunger-like servo member 34 in the direction of the longitudinal axis 14 extending through them in the servo action direction 12. On the two terminal sections of this servo member 34 in each case a flexible outer diaphragm or membrane element 35a and 35b makes sealing contact, such element being secured on the other hand to the regulator housing 7 in a sealing fashion. Each outer diaphragm element 35a and 35b delimits with the axially adjacent terminal wall 35a and 35b of the housing chamber 8 a first and, respectively, a second control chamber 37a and 37b, the diaphragm face facing the respective control chamber constituting in each case one of the two above mentioned fluid actuating faces 15a and 15b.

At an axial distance from each outer diaphragm element 35a and 35b there is in each case an inner diaphragm element 38a and respectively 38b, which in a sealing manner is applied on the one hand to one of the closure members 33a and respectively 33b and on the other hand to the regulator housing 7. The inner diaphragm elements 38a and 38b respectively delimit the associated venting chamber 28 and respectively the supply chamber 27 at the side axially opposite to the transfer opening 32a and respectively 32b.

Between a respective pair of inner and outer diaphragm elements 38a, 35b, 38b and 35b a first and respectively second pressure compensation chamber 42a and respectively 42b is enclosed. It is constantly connected with the power chamber 26 by way of at least one pressure compensation duct 43a and 43b extending through the associated closure member 33a and 33b. The pressure compensation duct 43a and 43b opens radially within the facing valve seat 31 at the axial end face of the respective closure member 33a and 33b. Alternatively the pressure compensation ducts 43a and 43b could also be formed in the regulator housing 7.

Each closure member 33a and 33b is biased by an associated mechanical spring means 44a and 44b in relation to the servo member 34 axially toward the opposite vent member. When the associated spring means 44a and 44b is compressed the two closure member 33a and 33b may be shifted axially in relation to the servo member 34, which is coaxially surrounded by them.

In the working embodiment the spring means 44a and 44b are in the form of compression spring means, which respectively coaxially surround the servo member 34, and at one end same bear against a widened head 45a and 45b, serving for the attachment of the outer diaphragm element 35a and 35b, of the servo member 34 and at the other end bear against the floor of a recess, having a larger diameter than the servo member 34, of the adjacent closure member 33a and 33b.

Axially betwixt the two closure members 33a and 33b there is an entraining section 46 of the servo member 34. Its diameter is larger than the longitudinal section, carrying the respectively adjacent closure member 33a and 33b, of the servo member 34 so that it is in a position of functioning as an abutment for movement of the two closure members 33a and 33b and limiting the displacement of the respectively closure member 33a and 33b toward the respectively other closure member in relation to the servo member 34.

The diaphragm elements 35 and 38 possess rubber-elastic or resilient properties. They serve to suspend on the one hand the servo member 34 and on the other hand the closure members 33a and 33b in such a manner on the regulator housing 7 that they can perform the above mentioned servo movement 13. In this respect the design is such that in the pressureless state of the system the configuration illustrated in FIG. 1 obtains in which the servo means 12 assumes a home position, the two closure members 33a and 33b engaging the facing valve seat 31 in a sealing fashion and keeping the associated transfer opening 32a and 32b closed. The length of the entraining section 46 is so selected that in such home position it just contacts the two closure members 33a and 33b or is at a minimum distance therefrom.

For reproducibly setting the home position it is however an advantage if in addition two further spring means 47a and 47b are present, which act between the servo member 34 and the regulator housing 7 and which thrust the servo member 34 in mutually opposite axial directions so that it is clamped in the home position between these further spring means 47a and 47b and is centered. If at least one of these further spring means 47b may have its spring force adjusted—as indicated in FIG. 1 by the oblique arrow 47'—the overall system may be so adjusted during assembly that the home position is in a pressureless state.

By adjustment of the level of the bias due to the further spring means 47a and respectively 47b it is also possible to influence the level of the fluid servo force necessary for shifting the servo member 34 and hence the characteristic of the position regulator.

If starting in the home position the servo member 34 is shifted in the other or the other direction, the respective closure member which is to the fore in terms of the direction of movement will be moved clear of the associated valve seat 31 by the entraining section 46. The other following closure member on the other hand will be held back in place by its associated valve seat 31, the spring means 44a and respectively 44b, acting between it and the servo member 34, being compressed so that the thrust force acting in the closing direction will be increased.

The two fluid actuating faces 15a and 15b provided on the outer diaphragm elements 35a and 35b are equal in size. The term "fluid actuating face" in the present context always means the effective fluid actuating face, which is relevant for the calculation of the servo forces produced and in the case of a diaphragm, unlike the situation with a piston for example, is generally less than the total cross sectional area owing to its deformation behavior. To the extent that in the present description the term fluid actuating face is employed, the effective fluid actuating face is always to be understood.

The two control chambers 37a and 37b are respectively connected by way of a first and respectively a second control duct 48a and 48b with a common control pressure connection 52. In the working embodiment the control pressure connection 52 is constituted by the output of a diagrammatically indicated pressure regulator 53, which is designed as a constituent of the position regulator 1 and on the inlet side is connected with the supply connection 22. It is in this manner that the control pressure medium is tapped from the supply connection and extra connection means are unnecessary. By way of the pressure regulator 53 the desired control pressure may be precisely set, it as a rule being substantially lower that the supply pressure.

It is however also possible as well to supply the control pressure at a desired level independently from the supply connection separately as is indicated in FIG. 2 in chained lines at 52'.

In the course of the two control ducts 48a and 48b there is in each case a choke member 54a and 54b, for example in the form of a narrower portion of the duct. Preferably the two choke means 54a and 54b have the same choking effect.

From each control duct 48a and 48b there extends a venting duct 56a and 56b leading to a venting opening 55a and 55b. As related to the flow direction toward the respective control chamber 37a and 37b the point of tapping of the venting duct 56a and 56b is downstream from the associated choke means 54a and 54b. The venting duct 56a and 56b could also branch directly from the associated control chamber 37a and 37b.

The two venting openings 55a and 55b are constituents of the above mentioned control valve means 16. Same is in a position of opening or closing the two venting openings 55a and 55b as selected, including the possibility of causing a simultaneous closing of both venting openings 55a and 55b. If one of the venting openings is opened, the respectively other venting opening will be closed.

The control valve means 16 of the working example is able to be operated with the function of a continuous action valve. In addition to the closed position and the maximum open position there are accordingly intermediate positions for adjustable setting of venting cross sections of different size. Alternatively for influencing the flow rate of the leaving pressure medium a pulse width modulated control for the control valve 16 could take place.

The control valve means 16 can theoretically be designed as an electromagnetically activated system. However it is preferred to have a design of the piezoelectric type. Thus for instance the position regulator 1 can comprise two piezo-electrically activated valve members 57a and 57b associated respectively with one of the two venting openings 55a and 55b. These piezoelectric valve members are respectively constituted by a strip-like piezoelectric flexural transducer 58a and 58b, which is bent in a deflection plane 62 at a right angle to the principal plane of extent of the respective flexural transducer 58a and 58b, when a corresponding control voltage is applied to it. In the closed position the valve members 57a and 57b respectively engage the associated valve seat 63 surrounding the associated venting opening 55a and 55b with a sealing effect.

The control valve means 16 could have its own control valve for each venting opening 55a and 55b. In the working embodiment the control valve means 16 on the contrary consists of a single 3/3 way continuous action valve in a design as appears in the patent publication EP 1 207 329, whose content is expressly incorporated by reference in the present specification. In this case the two piezoelectric flexural transducers 58a and 58b are arranged alongside each other with the planes of extent coinciding and joined together by way of a rigid bearing section 64, provided at one end, to give a U-like or forked integral flexural transducer unit 65.

Both flexural transducers 58a and 58b are able to be electrically controlled, preferably independently of each other or in a permanently set fashion matching each other, the electrical lines necessary for this not being illustrated in detail in the drawings. This type of control renders possible a manner of operation which is ganged in a special fashion. It is furthermore important that in its bearing section 64 the flexural transducer unit 65 is so secured to the valve housing 66, which is only illustrated in FIG. 4, of the control valve means that the entire flexural transducer unit 65 is able to pivot about an axis of rotation 67 normal to the deflection planes 62 in relation to the valve housing 66. There is accordingly no rigid clamping in position but a bearing which ensures the above mentioned possibility of rotational movement.

Preferably the flexural transducer unit 65 is acted upon by a mechanical spring means, not illustrated, so that in the electrically deactivated state it assumes the closed position as shown in FIG. 1 with both valve members 57a and 57b. Starting from here each flexural transducer 58a and 58b may be so driven that it clears the associated venting opening 55a and 55b and therefore, dependent on the stroke, opens the venting cross section to a greater or lesser extent. By simultaneous activation of the respectively other flexural transducer applying a force effective in the closing direction the opening stroke may be increased further in case of need. On the basis of the rigid connection on the bearing section 64 the resulting bending of the flexural transducer bearing against the valve seat 63 entails a pivoting of the entire flexural transducer unit 65 about the axis 67 of rotation) so that the already lifted flexural transducer is deflected even farther.

The use of the flexural transducer unit 65 offers however the further advantage that precisely symmetrical design features may be obtained, which efficiently further the object of getting precise position regulation. On additionally considering the regulator housing 7 with the servo means 12 accommodated therein, which are also symmetrical designed with reference to the longitudinal center, there is all in all a symmetrically designed position regulator 1.

In what follows an account of a typical manner of operation of the position regulator 1 will be given.

On putting the system into operation pressure medium is introduced by way of the supply connection 22 into the supply chamber 27 and furthermore—past the pressure regulator 53—into the two control chambers 37a and 37b, the servo means 12 assuming its home position as shown in FIG. 1. In this condition the output drive part 4 of the connected power device 2 also assumes its home position, which is indicated in chained lines in FIG. 1.

Owing to the identical fluid actuating faces 15a and 15b on the two outer diaphragm elements 35a and 35b the servo member 34 dwells in its home position. This is the more so because the pressure forces, resulting from the supply pressure, at the associated first closure member 33a and the first inner diaphragm element 38a borne by same compensate or equalize each other. The two venting openings 55a and 55b are closed.

In order now to extend the output drive part 4 the fluid pressure obtaining in the second control chamber 37b nearest to the supply chamber 27 is reduced. In accordance with FIG. 2 this happens on opening the second venting opening 55b connected with the associated second control duct 48b by suitable actuation of the control valve means 16. The second choke means 54b placed upstream in this case prevents excessive fluid loss from the control pressure connection 52. The flow rate allowed by the choke means 54b is preferably substantially lower than the venting flow rate obtainable through the control valve means 16.

Because the pressure in the first control chamber 37a remains constant owing to the still closed first venting opening 55a, the relationships between the forces at the servo means 12 are changed and the servo member 34 is shifted toward the vented second control chamber 37b. In this case the first closure member 33a, together with its entraining section 46, comes clear of the associated valve seat so that the second transfer opening 32b, located between the supply chamber 27 and the power chamber 26, is opened. Accordingly pressure medium may flow out of the supply connection 22 to the power connection 24 and hence to the drive chamber 5 of the connected power device 2.

Since owing to the pressure compensation ducts 43a and 43b the pressure obtaining in the pressure compensation chambers 42a and 42b is equal in size to the pressure in the power chamber 26, a pressure force compensation or equalization takes place so that the first closure member 33a is held in the closed position by the first spring means 44a.

When the output drive plug 4 has reached the desired position the second venting opening 55b is closed again under the control of the electronic control means 18. By way of the second choke means 54b the full control pressure will hence be reestablished in the second control chamber 37b after a short time so that the servo means 12 returns to the home position as shown in FIG. 1. Since the control pressure now remains constant in the two control chambers 37a and 37b, the power pressure does not change any more and the output drive part 4 dwells in the desired position, Owing to the two further spring means 47a and 47b the home position will be adhered to even if the control pressure should drop for some reason.

For resetting the output drive part 4 as shown in FIG. 3 the control valve means 16 is so controlled that the second venting opening 55b remains closed, whereas the first venting opening 55a is no longer held. In this manner the connected first control chamber 37a is vented by way of the associated first control duct 48a. As a consequence the various diaphragms are acted upon asymmetrically by pressure forces—the control pressure obtaining in the second control chambers 37b in fact remains constant—so that the servo member 34 moves toward the first control chamber 37a and the entraining section 46 lifts the first closure member 33a from the associated valve seat. By way of the thus cleared first transfer opening 32a the power connection 24 is accordingly vented together with the connected drive chamber 5 into the venting connection 23.

Once the output drive part 4 has returned to the desired position, the control means 18 switches the first valve member 57a back into the closed position so that the two venting openings 55a and 55b are closed. Now the predetermined control pressure set by the control pressure connection 52 may be reestablished in the first control chamber 37a by way of the first choke means 54a. Accordingly the servo means 12 will return again into the home position as shown in FIG. 1 and the pressure set at the power connection 24 will again remain unchanged.

An advantage with the design described in the example is the feature that the servo member 34 assumes its home position, when there are identical pressure conditions in the two chambers 37a and 37b. In this case the power connection 24 will be simultaneously shut off both from the supply connection 22 and also from the venting connection 23 in a fluid-tight fashion and the fluid pressure obtaining in it remains constant.

What is claimed is:

1. A fluid operated position regulator for power devices comprising a regulator housing, in which at least one servo means, which is able to be shifted by controlled fluid actuation with the performance of a positioning movement, is arranged, said servo means being able, in a fashion dependent on its position, to place, in different manners, a supply connection, a venting connection and a power connection provided for the connection of the power device, in a fluid circuit with each other, wherein for setting its position the servo means has two fluid actuating faces facing in opposite directions of the servo motion and of equal effective sizes, each such fluid actuating face delimiting a control chamber and the two control chambers being provided with a common control pressure connection with which they are respectively connected for fluid flow by way of an intermediately placed choke means and the two control chambers are connected downstream from the respectively associated choke means with a venting connection, said two venting connections being provided with an electrically actuated control valve means, said control valve means constituting a single structural unit with the regulator housing and being able to respectively selectively open or close the two venting connections, such closing being adapted to simultaneously close of both venting connections.

2. The position regulator as set forth in claim 1, wherein the control pressure connection is connected on its input side with the supply connection, with the intermediate connection of a pressure regulator designed as a component of the structural unit.

3. The position regulator as set forth in claim 1, wherein the control valve means is designed for continuous operation and/or for pulse width modulated operation.

4. The position regulator as set forth in claim 1, wherein the control valve means possesses piezoelectrically activatable valve members.

5. The position regulator as set forth in claim 1, wherein the control valve means exhibits two valve members which are respectively associated with one of the venting connections and are arranged in a valve housing, said valve members being constituted by two adjacently placed strip-like piezoelectric flexural transducers, which are components of an integral flexural transducer unit.

6. The position regulator as set forth in claim 5, wherein the flexural transducer unit is mounted for pivoting, in relation to the valve housing, about a pivot axis, said axis extending normally to the planes of deflection of the flexural transducers, said mounting being on a bearing section which is arranged at one end of the flexural transducer unit and produces a rigid connection between the two flexural transducers.

7. The position regulator as set forth in claim 1, wherein the two control chambers are formed by the mutually axially opposite end sections of a housing chamber containing the servo means.

8. The position regulator as set forth in claim 1, wherein the servo means assumes, when there are identical fluid pressure conditions in the two control chambers, a position disconnecting the power connection both from the supply connection and also from the venting connection.

9. The position regulator as set forth in claim 1, wherein the two fluid actuating faces are provided on respectively one diaphragm element.

10. The position regulator as set forth in claim 1, wherein the servo means is arranged in a housing chamber of the regulator housing and possesses a plunger servo member extending in the longitudinal direction of the housing chamber and able to be set in relation to the regulator housing, such servo member being movably suspended on the regulator housing at its two terminal sections by way of an outer diaphragm element defining the associated fluid actuating face.

11. The position regulator as set forth in claim 10, wherein the servo member bears, in a coaxial arrangement, two closure members, which are able to be axially set in relation to the servo member and to the regulator housing, such closure members being axially spaced apart from each other and being acted upon by spring means in relation to the servo member and in a direction toward each other and being respectively opposite one of two axially oppositely orientated valve seats, between which a power chamber connected with the power connection is arranged, such power chamber being connected by transfer openings, delimited by the valve seats, on the one hand with a supply chamber arranged on the same side and connected with the supply connection and on the other hand with a venting chamber connected with the venting connection, such venting chamber being arranged on the opposite side, and an entraining section, lying between the closure members, of the servo member being so designed that starting in a home position of the servo member, in which the two closure members engage the associated valve seat and close the associated transfer opening, the entraining section dependent on the servo direction of the servo member lifts the one or the other closure member from the associated valve seat.

12. The position regulator as set forth in claim 11, wherein the servo member assumes the home position, when there are identical pressures in the two control chambers.

13. The position regulator as set forth in claim 11, wherein each closure member is suspended, in a manner allowing movement in relation to the housing, by way of an inner diaphragm element, which is placed internally with a clearance axially to the fore of an adjacent outer diaphragm element, and the inner diaphragm element separates in a sealing fashion the respectively adjacent supply chamber or respectively venting chamber from a pressure compensation chamber which is placed between the inner and the outer diaphragm element and each pressure compensation chamber is constantly connected for fluid flow with the power chamber.

14. The position regulator as set forth in claim 13, wherein each pressure compensation chamber is constantly connected for fluid flow with the power chamber via the respectively adjacent closure member.

15. The position regulator as set forth in claim 10, wherein the servo member is axially biased by two oppositely acting spring means in relation to the regulator housing.

16. The position regulator as set forth in claim 15, wherein the servo member is centered in position by the two oppositely acting spring means.

17. The position regulator as set forth in claim 15, wherein at least one of the spring means is able to be adjusted as regards its spring force.

* * * * *